United States Patent

Stevens

[11] 4,089,031
[45] May 9, 1978

[54] SAFETY PROTECTION CIRCUIT

[76] Inventor: Troy Franklin Stevens, 407 Parma, Lake Villa, Ill. 60046

[21] Appl. No.: 780,602

[22] Filed: Mar. 24, 1977

[51] Int. Cl.$^2$ .............................................. H02H 3/04
[52] U.S. Cl. ..................................... 361/50; 340/255
[58] Field of Search ...................... 361/42, 47, 48, 49, 361/50; 340/255

[56] References Cited

U.S. PATENT DOCUMENTS

| | | | |
|---|---|---|---|
| 3,171,062 | 2/1965 | Rowe, Jr. | 361/50 |
| 3,340,433 | 9/1967 | Almquist | 361/50 |
| 3,386,004 | 5/1968 | Dwyer | 361/50 |
| 3,965,395 | 6/1976 | Young | 361/42 |

Primary Examiner—Harry E. Moose, Jr.
Attorney, Agent, or Firm—Robert L. Lindgren; Edward D. Gilhooly; Davis Chin

[57] ABSTRACT

A safety protection circuit for controlling the operation of electrically-powered tools including a switching device. In one application, the power tool is a drill which is utilized in drilling a hole through electrically non-conductive material such as a concrete floor and an electrically conductive material such as a grounded metallic conduit having electrical cables therein disposed directly below the floor. The switching device automatically discontinues the drilling operation when the drill bit contacts the metallic conduit after passing through the concrete floor thereby avoiding any damage to the cables within the metallic conduit or causing a safety hazard. Subsequently, the drill can be reactivated to penetrate the metallic conduit. The switching device will again automatically discontinue the operation of the drill after breaking contact with the metallic conduit.

18 Claims, 1 Drawing Figure

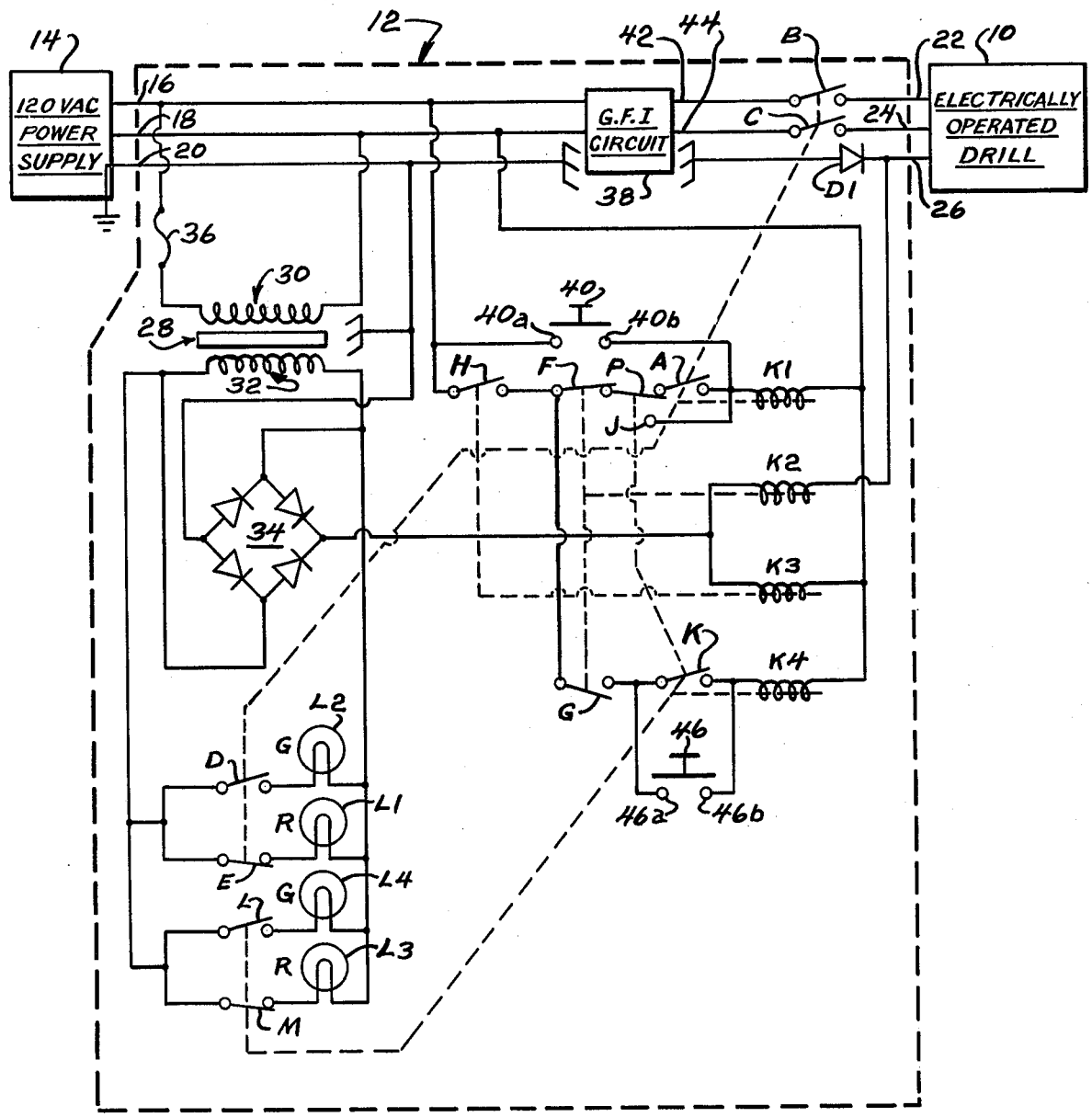

SAFETY PROTECTION CIRCUIT

BACKGROUND OF THE INVENTION

This invention relates generally to safety protection circuits and more particularly, it relates to an improved safety protection circuit for controlling the operation of electrically-operated power tools such as drills, saws and the like.

Power and communication lines disposed in conductive materials, such as metallic conduits and pipes, are employed extensively in modern construction. In the case of a building, these grounded electrically conductive metallic conduit and pipes are frequently installed beneath floors formed of concrete, wood and other similar electrically non-conductive materials when initially erected.

In the subsequent installation of new electrical equipment, it is generally necessary to provide access to the electrical wires in the grounded electrically conductive metallic conduits beneath floors or other structures in order to provide suitable wiring for operation of the newly installed equipment. This entails the necessity of drilling a hole through the floor or other structure and also the electrically conductive conduit for access to the power and/or communication lines. While performing such operations, it is essential not to penetrate or otherwise damage the lines contained in the conduit which can result in short-circuits, serious line damage, explosions, fires, and numerous other hazardous conditions. It is also possible to produce dangerous electrical shocks or even electrocution of a drill operator upon accidential penetration of the power lines.

Until the subject invention a drill operator could only roughly estimate when he would complete drilling through a floor or other structure and the metallic electrically conductive conduit and thus stop the operation of the drill to avoid penetration and damage of the electrical cables contained in the conduit. This is a very unreliable method and creates a potentially hazardous condition each time such a hole is needed. In an attempt to by-pass this dangerous and hit-or-miss technique, a hammer and chisel are frequently utilized for manually cutting a hole in the floor or other structure and then very carefully penetrating the metallic conduit with a second cutting device. While this process is workable, it is inefficient, uneconomical and time-consuming.

It has been known in the prior art to provide a safety circuit for power tools such as drills which will stop the operation thereof upon contact with a conductive material. However, there was no provision made for allowing the drill to be re-activated for penetrating the conductive material. It was thus necessary to by-pass the safety circuit in order to activate the drill for further operation or otherwise a second drill was needed to cut through the conductive material. This was very inconvenient to the operator and caused delays in the number of holes that could be drilled. Accordingly, it would be desirable to provide a safety protection circuit for drills such that the drill can be re-activated after it has stopped due to penetration of the non-conductive material and subsequent contact with the conductive material by simply depressing a push-button switch.

It has, therefore, been found to be desirable to incorporate a safety protection circuit in electrically-operated power tools such as drills and the like which will operate automatically to discontinue the power to the tool and thus interrupt operation of the power tool when it has penetrated a first material of the electrically non-conductive type thus protecting the cables from damage and preventing potentially serious injury to the operator. Subsequently, the tool can be re-activated to penetrate a second material, this time of conductive type. The circuit will be controlled to again automatically shut-off the power to the tool after breaking contact with the second material.

It has also been found to be desirable to provide an indicator system to display the operative condition of the tool, i.e., whether the tool is ready for operation to penetrate a first material or a second material. Further upon the occurrence of various unsafe operating conditions, such as leakage or fault current between the "hot side" wire of the power source and the building ground wire or leakage current between the neutral wire and the building ground wire, it is desired to provide a control means to automatically interrupt operation of the power tool.

SUMMARY OF THE INVENTION

Accordingly, it is an object of the present invention to provide a safety protective circuit which overcomes the disadvantages encountered in the prior art devices.

An object of the present invention is to provide a new and novel safety protection circuit for power tools such as drills wherein the drill can be re-activated after it has stopped due to contact with a conductive material by simply depressing a push-button switch.

An object of the present invention is to provide an improved safety protection circuit for use in conjunction with electrically-operated power tools such as drills. The circuit is controlled to electrically disconnect the drill after penetration of a first material and which can be reactivated to penetrate a second material. Upon breaking complete contact with the second material, the circuit is controlled to again automatically interrupt the power to the drill.

An object of the present invention is to provide an improved safety protection circuit for controlling the operation of electrically-operated power tools which will automatically prevent or stop the operation of such tool upon the detection of certain hazardous conditions.

It is an object of the present invention to provide an improved safety protection circuit for use in conjunction with electrically-operated power tools which has indicating means for displaying preselected operative tool conditions such as whether the power tool is ready for operation to penetrate a first material or a second material.

An object of the present invention is to provide a safety protection circuit which controls automatic interruption of the operation of electrically-operated power tools after penetration of a first material and prior to contact with electrical cables or wires thereby avoiding damage thereto and preventing injury to the operator of the tool.

It is an object of the present invention to provide an improved safety protection circuit which is relatively simple in construction and is easy and economical to manufacture.

In accordance with these aims and objectives, the present invention is concerned with the provision of a safety protection circuit for controlling the operation of electrically-operated power tools. In one of its applications, the power tool is a drill which is utilized to provide access to buried electrical cables in grounded metallic conduits positioned beneath concrete floors. The safety protection circuit includes switching means for closing and opening contact means which connects a power source to the drill. The switching means automatically interrupts the drilling operation when the drill bit contacts the grounded metallic conduit to protect both the electrical cables and the drill operator. Subsequent to the initial interruption, the drill can be reactivated to penetrate the grounded electrically conductive metallic conduit. The switching control means will again automatically interrupt the drilling operation after breaking contact with the metallic conduit.

An indicating means is provided for visually displaying the operative condition of the tool. It indicates which material, i.e. electrically non-conductive or electrically conductive, is to be drilled.

The safety protection circuit may include a ground fault interrupter circuit which is coupled to the switching means to prevent operation of the power tool upon the occurrence of a fault current between the hot wire and the grounded wire of the power source.

Additionally, a relay means coupled to the switching means is provided to prevent closing of the switching means and thus operation of the power tool upon the occurrence of a fault current between the neutral wire and the grounded wire of the power source.

The instant invention is particularly efficient and economical in providing a safety protection circuit for controlling the operation of electrically-operated power tools since it is relatively simple in construction and is easy to manufacture and assemble for use.

BRIEF DESCRIPTION OF THE DRAWING

These and other objects and advantages of the present invention will become more fully apparent from the following detailed description when read in conjunction with the accompanied drawing in where there is shown a schematic diagram of the safety protection circuit according to the instant invention for controlling the operation of electrically-operated power tools.

DETAILED DESCRIPTION OF THE PREFERRED EMBODIMENT

It is to be distinctly understood at the outset that the present invention shown in association with a drill is not intended to serve as a limitation upon the scope or teachings thereof, but is merely for the purpose of convenience of illustration of one example of its application. The present invention has numerous applications in other fields and apparatus since the invention pertains to a safety protection circuit for controlling the operation of electrically-operated power tools in order to avoid the damaging of cables or causing a safety hazard.

Although not intended to be so limited, the safety protection circuit of this invention is described hereinafter for use in conjunction with a drill which is utilized for penetrating a layer of electrically non-conductive material such as a concrete floor and an electrically conductive material such as a grounded metallic conduit underlying which are electrical cables within the conduit.

Referring now in detail to the schematic diagram, the electrical power tool is shown in a block entitled as an electrically-operated drill for the purpose of convenience in illustration and is designed by reference numeral 10. The safety protection circuit 12 of the present invention is preferably mounted in a not-shown housing. A power supply 14 of 120 VAC or other suitable voltage is connected to the input of the safety protection circuit 12 via three conductors from the respective units which can be joined together by male and female plugs (not shown). The three conductors consist of a hot wire 16, a neutral wire 18 and a building ground wire 20. The power for the drill 10 is derived through conductors 22 and 24 connected to the output of the protection circuit 12. A conductor 26 is tied to the housing of the drill 10 at its one end. The conductors 22, 24 and 26 leading between the output of the protection circuit 12 and the input of the drill 10 can be likewise provided with male and female plugs for interconnection.

The safety protection circuit 12 is provided with power through a step-down transformer 28, the primary winding 30 being connected across the wires 16 and 18 and the secondary winding 32 being connected across the input of a bridge rectifier 34. A fuse 36 interconnected between the wire 16 and one side of the primary winding 30 protects the protection circuit 12 since it will be blown when there is an excessive surge current in the wire 16. The hot wire 16 is also provided to one input of a ground fault interrupter circuit 38 and one contact 40a of a momentary push-button switch 40. The neutral wire 18 is tied to the second input terminal of the interrupter circuit 38 and to one side coil of a relay K1. The relay K1 has five sets of contacts A, B, C, D, and E, respectively.

The ground fault interrupter circuit 38 is of the conventional type which can be purchased from Square D Company under their trademark QUICK-GARD. The interrupter circuit 38 has a circuit breaker which opens to thereby interrupt the flow of current in the wires 16 and 18 when a leakage of fault current is detected or present between the hot wire 16 and the building ground wire 20. Each of the outputs of the circuit 38 via conductors 42 and 44 is connected to a respective side of the normally-opened contacts B and C of the relay K1. The other sides of the respective contacts B and C are connected to the conductors 22 and 24.

The output of the bridge rectifier 34 is fed to one side of the coil of a relay K2 and to one side of the coil of the relay K3. The other side of the relay K2 is tied to the ground of the protector circuit 12 via a reverse biased diode D1 and to the housing ground of the drill 10. The other side of the relay K3 is connected to the neutral wire 18 and one side of the coil of a relay K4. The relay K2 is provided with a normally-closed contact F and a normally-opened contact G. The relay K3 has a normally-opened contact H, and the relay K4 has a pair of normally-opened contacts J and K and a normally-closed contact P.

The other side of the relay K1 is joined to the other side of the switch 40 at its contact 40b. The contacts H, F, P and A are arranged in a series connection which is parallelled across the switch 40. The normally-opened contact J of the relay K4 is connected in parallel across only a portion of the series connection which is formed by contacts F, P and A. The other side of the relay K4 is tied to one side of its normally-opened contact K which is in series with one end of the contact G of the relay K2. The other end of the normally-opened contact G is joined to the junction of the series connection of the contacts H and F. A second momentary push-button switch 46 having its contacts 46a and 46b are positioned in parallel with the contact K of the relay K4.

The relay K1 having additional contacts D and E, the relay K4 having additional contacts L and M, and lamps L1 through L4 are utilized to form indicating means of the protection circuit for displaying the operative conditions of the tool, for instance, whether the tool is in a first mode ready for operation to penetrate a first material or in a second mode to penetrate a second material. The normally-opened contact D and lamp L2, normally-closed contact E and lamp L, normally-opened contact L and lamp L4 and normally-closed contact M and lamp L3 form four series connections. Each of these series connections are coupled in parallel with each of the others and are also connected in parallel with the secondary winding 32 of the transformer 28.

Prior to operation, the power source 14 is applied to the input of the protective circuit 12 and the electrically-operated power tool 10 is coupled to the output of the protective circuit 12. In this condition, all of the relays are de-energized and their contacts are in the position as illustrated in the schematic diagram, except for the relay K3 and its normally-opened contact H. This relay K3 will be in the energized condition and its contact H will be closed if the neutral wire 18 is at the same potential as the building ground wire 20. Otherwise, the contact H will remain open to indicate that a leakage current exists which creates a potentially unsafe condition and can possibly produce dangerous electrical shocks and other injuries to personnel in the area. Thus, the contact H functions as a safety feature since it will remain open to prevent operation of the drill 10 unless there is no leakage or fault current between the neutral wire 18 and the ground wire 20. In addition, the contact H serves to further indicate that possible problems may exist in the electrical wiring in the building. Another unsafe condition occurs when there is a fault or leakage current between the hot wire 16 and the building wire 20. It has likewise been found desirable to prevent operation of the power tool 10 upon the occurrence of this latter condition. In order to insure that such condition does not exist, the ground fault interrupter circuit 38 may be interposed in the power lines 16 and 18 between the power source 14 and the contacts B, C whose other ends are applied to the power tool. If a fault current is sensed between the wires 16 and 20, the interrupter 38 having a circuit breaker on the inside will be tripped to open the powerlines and therefore prevent operation of the drill 10.

Since contacts D, E, L, and M are in their state as shown, preliminary to the drilling operation, both the red lamps L1 and L3 will be lit through the contacts E and M respectively. With the drill 10 having a not-shown on-off switch in the off-position and assuming that there are no fault currents, the drill 10 can be rendered to be operative by momentarily depressing the push-button switch 40 to energize the relay K1 thereby closing the contacts B and C and enabling current to flow through to the drill 10. After the switch 40 is released, the relay K1 will remain energized due to the series connections of contacts H, F, P and A which will be all closed. Simultaneously, the red lamp L1 will become extinguished since the contact E will be opened and the green lamp L2 will light via the closure of contact D to indicate that the drill is ready for operation in its first mode. In its first mode, the drill can be utilized for penetrating a first material which is a layer of electrically non-conductive material such as concrete floor and the like. When the switch on the drill is turned to the on-position, a circuit is completed between the conductors 22 and 24 to the drill 10 thereby permitting operation of the drill.

Upon the event of the drill bit making contact with an electrically grounded conductive material, such as a metallic conduit carrying electrical cables therein which is beneath the concrete floor, the relay K2 will become energized through the conductor 26 which is connected to the housing ground of the drill 10. Since the relay K2 will be in the energized state, the normally-closed contact F will become open thereby de-energizing the relay K1 and opening up the contact B and C to stop operation of the drill 10. Then, the switch on the drill is returned to its off-position as its first mode of operation is completed. The red lamp L1 will light again and the green lamp L2 will now be extinguished. At the same time, the normally-opened contact G controlled by the relay K2 will become closed to permit the drill 10 to be further operable in a second mode.

In the second mode, the drill can be re-activated for penetrating the metallic conduit beneath the concrete floor by simply depressing the switch 46 as will be explained more fully hereinafter. Thus, this allows an operator to resume operation of the drill without any unnecessary inconvenience and delays as experienced in the prior art devices.

Prior to replacing into operation the drill 10, the drill bit for drilling through concrete may be removed and substituted by a metal drilling bit. With the metal bit installed, the drill 10 can be subsequently positioned to rest on the metallic conduit thereby closing contact G. In order to re-activate the drill 10 again, the switch 46 is momentarily depressed to energize the relay K4 closing the contact J and thereby supplying current to the relay K1. The relay K1 will then become energized to close once again the contacts B and C thus delivering power to the drill 10 for operation. After the switch 46 is released, the relay K4 will remain activated due to the series connection of the contacts G and K which will be both closed. Further, the relay k1 will also once again remain energized due to closed series connection of contacts H and J. At the same instance, the red lamp L3 will become extinguished since the contact M will be open and the green lamp L4 will light due to the closure of the contact L to indicate the the drill is ready for operation in the second mode. In this second mode, the drill 10 is re-activated for penetrating the grounded metallic conduit carrying the electrical cables therein. When the switch on the drill 10 is placed in the on-position, the circuit from the conductor 22 and 24 and the drill 10 will be completed again to allow operation of the drill 10.

Once the drill bit penetrates the metallic conduit and is withdrawn thereafter, the relay K2 will become de-energized since the conductor 26 connected to the housing ground of the drill 10 will be ungrounded when the drill bit breaks contact with the conduit. When the relay K2 has returned to the de-energized state, the normally-opened contact G will cause the de-energization of the relay K4 to open contact J. This will in turn result in the de-energization of the relay K1 and opening up of the contacts B and C to arrest operation of the drill 10. It should be noted the relay K1 will not remain energized by the series connection of contacts H, F, P and A, even though contact P will return to its normally-closed state due to the de-energization of the relay K4 since the opening of contact J will occur before. The switch on the drill 10 is then returned to the off-position as the second mode of operation is completed. The red lamp L3 will be lit again and the lamp L4 will be extinguished.

The steps which have been described for drilling through the layer of electrically non-conductive material and the electrically conductive material can be repeated for the next hole to be drilled. It can thus be seen that both possible harm to the operator and damage to the underlying electrical cables are thereby prevented.

From the foregoing description of the safety protection circuit embodying the present invention, it can be seen there is provided a new and improved safety protection circuit which can be utilized for controlling the operation of electrically-operated power tools. Further, indicating means is provided for visually displaying the operative conditions of the tool such as whether the tool is ready for operation to penetrate a layer of electrically non-conductive material or an electrically conductive material. The safety protection circuit of the present invention is relatively simple in construction and is easy to assemble for use.

While there has been illustrated and described what is at present to be a preferred embodiment of the present invention, it will be understood by those skilled in the art that various changes and modifications may be made and equivalents may be substituted for elements thereof without departing from the true scope of the invention. In addition, many modifications may be made to adapt to a particular situation or material to the teachings of the invention without departing from the central scope thereof. Therefore, it is intended that this invention not be limited to the particular embodiment disclosed as a best mode contemplated for carrying out the invention but that the invention will include all embodiments falling within the scope of the appended claims.

What is claimed is:

1. A safety protection circuit for controlling the operation of electrically-operated power tools comprising:

switching means for closing and opening contact means which connect a power source to an electrically-operated power tool for penetrating electrically non-conductive material;

first relay means having a contact operatively connected to said switching means, said switching means being responsive to said first relay means for opening said contact means when the housing of the power tool is grounded upon contacting an electrically conductive material thereby disconnecting the power source to the power tool and stopping operation of the power tool;

second relay means having a contact operatively connected to said switching means;

actuating means for manually actuating said second relay means, said switching means being responsive to said second relay means upon actuation of said actuating means for subsequently closing said contact means when the housing of the power tool is grounded thereby reconnecting the power source to the power tool to resume operation of the power tool for penetrating the electrically conductive material; and said first relay means being operatively connected to said second relay means, said second relay means being responsive to said first relay means by causing the switching means to open again said contact means after breaking contact with the electrically conductive material thereby disconnecting again the power source from the power tool and stopping operation of the power tool.

2. A safety protection circuit as claimed in claim 1, wherein the electrically non-conductive material is a concrete floor.

3. A safety protection circuit as claimed in claim 1, wherein the electrically conductive material is a grounded metallic conduit.

4. A safety protection circuit as claimed in claim 1, further comprising indicating means for visually displaying whether the power tool is ready for operation to penetrate the electrically non-conductive material or the electrically conductive material.

5. A safety protection circuit as claimed in claim 1, further comprising a ground fault interrupter circuit coupled between the power source and the contact means of the switching means to prevent operation of the power tool upon the occurrence of a fault current between the hot wire and the grounded wire of the power source.

6. A safety protection circuit as claimed in claim 1, further comprising third relay means coupled to switching means to prevent closing of said switching means and thus the operation of the power tool upon the occurrence of a fault current between the neutral wire and the grounded wire of the power source.

7. A safety protection circuit as claimed in claim 5, further comprising third relay means coupled to said switching means to prevent closing of said switching means and thus operation of the power tool upon the occurrence of a fault current between the neutral wire and the grounded wire of the power source.

8. A safety protection circuit as claimed in claim 1, wherein said contact means comprises a pair of normally-opened contacts, each of the contacts being interposed in the power line between the power source and the power tool.

9. A safety protection circuit as claimed in claim 1, wherein said actuating means is a momentary push-button switch.

10. A safety protection circuit as claimed in claim 1, wherein said electrically-operated power tool is a drill.

11. A safety protection circuit for controlling the operation of electrically-operated power tools comprising:

switching means for automatically disconnecting a power source to an electrically-operated power tool after penetration of an electrically non-conductive material;

means for subsequently actuating said switching means to resume operation of the power tool for penetration of an electrically conductive material; and said switching means automatically disconnecting again the power source to the power tool after breaking contact with the electrically conductive material.

12. A safety protection circuit as claimed in claim 11, further comprising indicating means for visually displaying whether the power tool is ready for operation to penetrate the electrically non-conductive material or the electrically conductive material.

13. A safety protection circuit as claimed in claim 11, further comprising a ground fault interrupter circuit coupled between the power source and the switching means to prevent operation of the power tool upon the occurrence of a fault current between the hot wire and the grounded wire of the power source.

14. A safety protection circuit as claimed in claim 11, further comprising relay means coupled to switching means to prevent closing of said switching means and thus the operation of the power tool upon the occurrence of a fault current between the neutral wire and the grounded wire of the power source.

15. A safety protection circuit for controlling the operation of electrically-operated power tools which are connectable to power sources comprising:
switching means for selectively connecting and disconnecting a power source to an electrically-operated power tool;
said switching means automatically disconnecting the power source to the tool after penetration of a first material;
means operatively connected to said switching means for subsequently actuating said switching means to reconnect the power source to the tool for penetration of a second material; and
said switching means automatically disconnecting again the power source to the tool after breaking contact with the second material.

16. A safety protection circuit comprising:
switching means connectable between a power source and an electrically-operated power tool for automatically disconnecting the power source to the tool after penetration of a first material;
means for subsequently re-activating said switching means for penetration of a second material; and
said switching means automatically disconnecting again the power source to the tool after breaking contact with the second material.

17. A safety protection circuit for controlling the operation of electrically-operated power tools which are connectable to power sources comprising:
switching means for selectively connecting and disconnecting a power source to an electrically-operated power tool;
said switching means automatically disconnecting the power source to the tool after penetration of a first material; and
means operatively connected to said switching means for subsequently actuating said switching means to reconnect the power source to the tool for penetration of a second material.

18. A safety protection circuit comprising:
switching means connectable between a power source and an electrically-operated power tool for automatically disconnecting the power source to the tool after penetration of a first material; and
means for subsequently re-activating said switching means for penetration of a second material.

* * * * *